(12) United States Patent
Yang

(10) Patent No.: US 7,527,066 B2
(45) Date of Patent: May 5, 2009

(54) VALVE SET FOR A FAUCET CONTROLLED BY A HANDLE EASILY ATTACHABLE TO WOODEN AND ACRYLIC MATERIALS

(76) Inventor: Tsai-Chen Yang, 235 Chung-Ho Box 8-24, Taipei (TW)

( * ) Notice: Subject to any disclaimer, the term of this patent is extended or adjusted under 35 U.S.C. 154(b) by 71 days.

(21) Appl. No.: 11/543,764

(22) Filed: Oct. 6, 2006

(65) Prior Publication Data

US 2008/0083459 A1    Apr. 10, 2008

(51) Int. Cl.
*F16K 31/60*    (2006.01)

(52) U.S. Cl. .................................. 137/315.15; 137/359

(58) Field of Classification Search ............ 137/315.15, 137/359, 801
See application file for complete search history.

(56) References Cited

U.S. PATENT DOCUMENTS

| | | | | |
|---|---|---|---|---|
| 2,852,926 A | * | 9/1958 | Chervenka | 70/79 |
| 3,793,889 A | * | 2/1974 | Niskin | 374/157 |
| 4,241,503 A | * | 12/1980 | Sugiyama | 30/268 |
| 4,662,389 A | * | 5/1987 | Igbal | 137/359 |
| 5,737,950 A | * | 4/1998 | Yun-Bin | 70/379 R |
| 6,082,407 A | * | 7/2000 | Paterson et al. | 137/801 |
| 6,370,712 B1 | * | 4/2002 | Burns et al. | 4/675 |
| 6,584,648 B2 | * | 7/2003 | Ortega | 16/436 |
| 6,792,629 B2 | * | 9/2004 | Nelson et al. | 4/695 |
| 7,331,358 B2 | * | 2/2008 | Gallina et al. | 137/315.15 |
| 2004/0011987 A1 | * | 1/2004 | Ortega et al. | 251/291 |

* cited by examiner

Primary Examiner—Kevin L Lee
(74) Attorney, Agent, or Firm—Banger Shia

(57) ABSTRACT

A valve set for a faucet controlled by a handle easily attachable to wooden and acrylic materials comprises a control valve body, a lower block ring, a mounting ring, an upper block ring and a handle mount. The control valve body has upper and lower sections with screw thread, and a top control valve. The polygonal lower block ring has an inner screw thread for engaging the upper section. The mounting ring has a plurality of nails on an outer surface thereof for being embedded into a slab made of either wooden or acrylic materials. The upper block ring has an inner screw thread for engaging the upper section such that the upper block ring is attached onto an upper surface of the attached material. The handle mount is connected with the top control valve, whereby a handle will be urged to control the water flow through the top valve.

6 Claims, 7 Drawing Sheets

VALVE SET FOR A FAUCET CONTROLLED BY A HANDLE EASILY ATTACHABLE TO WOODEN AND ACRYLIC MATERIALS

FIELD OF THE INVENTION

The present invention relates to manually controlled valve set for a faucet that can be attached quickly on wooden and acrylic materials.

BACKGROUND OF THE INVENTION

Water faucets capable of providing hot water and cold water of the prior art mainly comprises a valve controlled by a handle so as to control the water flow. The upper and lower halves of the valve body are respectively provided with an upper and a lower block ring for securing the faucet on a slab of the basin. The top portion of the valve body is further installed with a decorative cover by a screw means. Thereby, the handle mount can be rotated to control water flow.

A water faucet of the prior art is installed at a predetermined location on the basin. The lower block ring is connected to a tube with an outer thread that penetrating the basin slab, so that it will be secured on the bottom side of the basin. By the same token, the upper block ring connected to the tube is secured on the top side of the basin. The block rings are so tightly mounted invalid rotation between the valve body and the disks is prevented. However, since the valve body needs to be tightly attached to the basin, it will be difficult to engineer the attachment, during which one hand of a worker must hold one of the block rings tightly and at the same time the other hand rotates the other block ring.

SUMMARY OF THE INVENTION

The primary objective of the present invention is to provide a valve set for a faucet controlled by a handle easily attachable to wooden and acrylic materials. The various objects and advantages of the present invention will be more readily understood from the following detailed description when read in conjunction with the appended drawings.

To achieve above object, the present invention provides a valve set for a faucet controlled by a handle easily attachable to wooden and acrylic materials, comprising: a control valve body with an upper section of screw thread and a top control valve; a lower block ring with a polygonal edge and an inner screw thread capable of being engaged with said upper section of screw thread of said control valve body; a mounting ring connected with said control valve body having a plurality of nails on an outer surface thereof, whereby said nails will be embedded into a slab selected from wooden and acrylic materials, and whereby said control valve body will be mounted on said slab; an upper block ring with an inner screw thread capable of being engaged with said upper section of screw thread of said control valve body so that said upper block ring can be attached onto, an upper surface of said slab; and a handle mount connected with said top control valve, whereby a handle will be urged to control a water flow through said top valve.

DETAILED DESCRIPTION OF THE PREFERRED EMBODIMENTS

Figure 1:
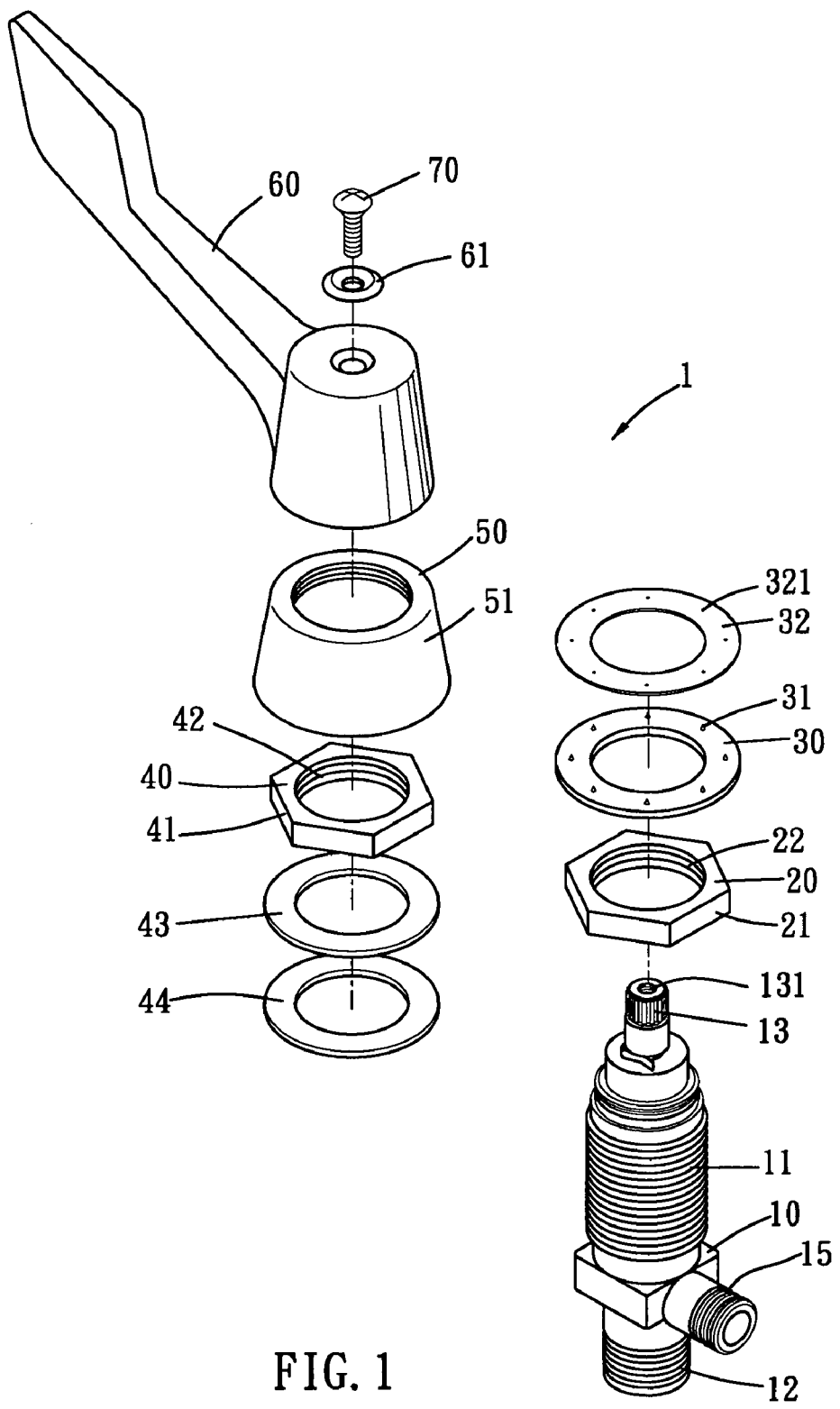
FIG. 1 is an exploded perspective view of a valve set for a faucet controlled by a handle of the present invention.
Figure 2:
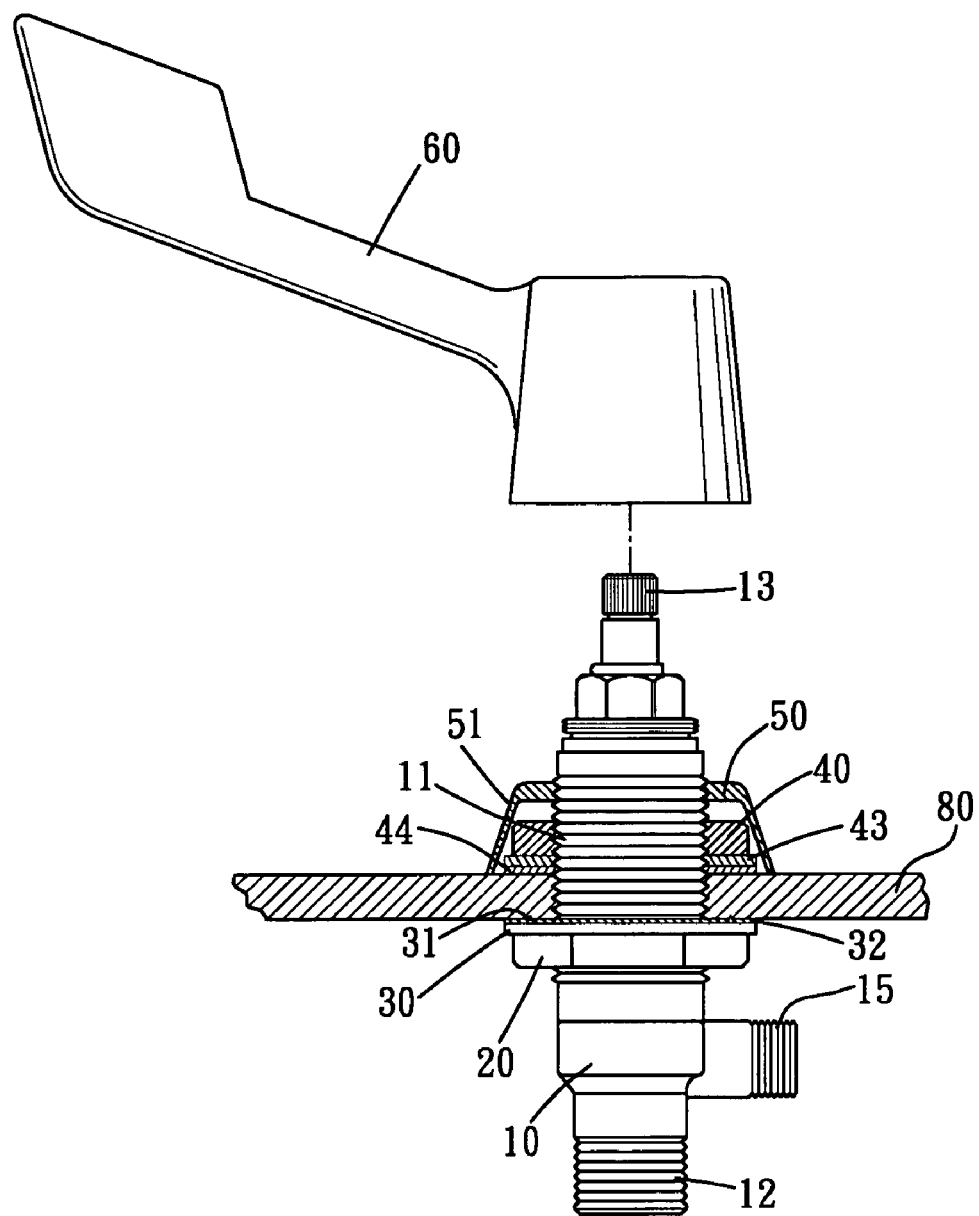
FIG. 2 is a side cross-sectional view of the valve set for a faucet controlled by a handle in FIG. 1.
Figure 4:
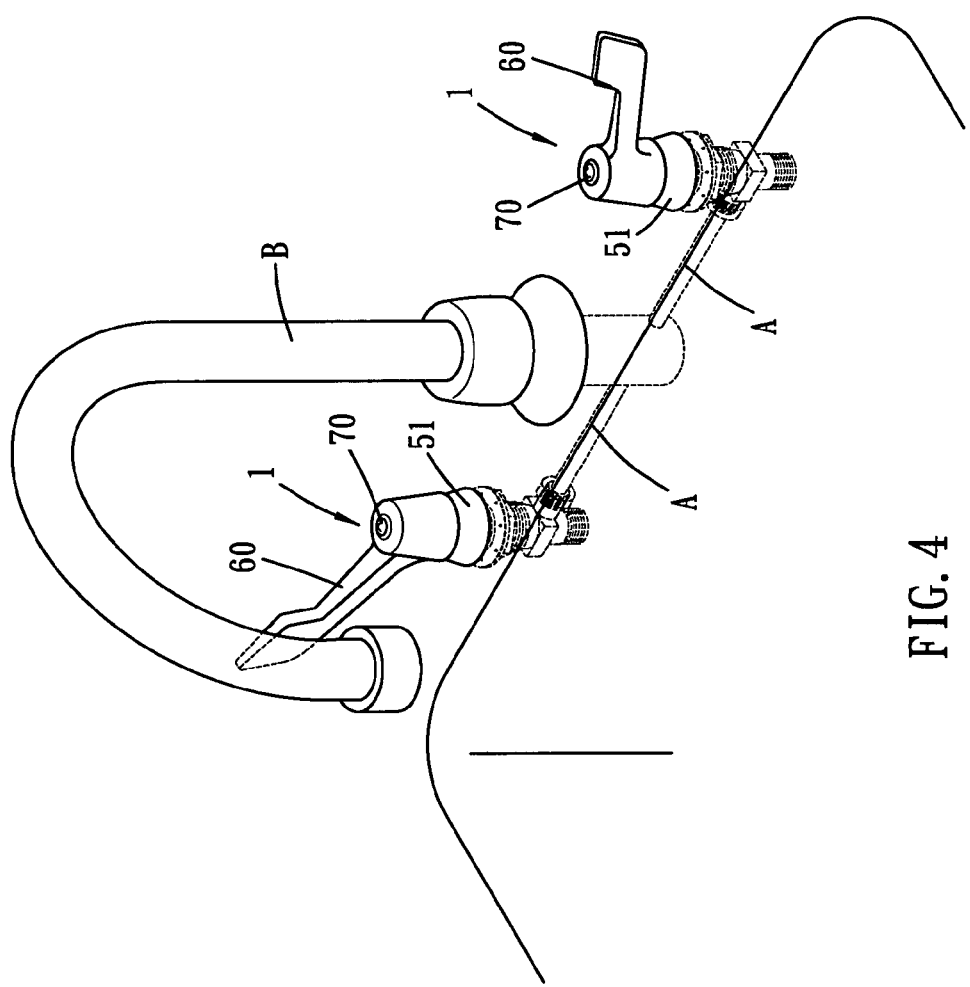
FIG. 4 is an exploded perspective view of the valve set for a faucet controlled by a handle in FIG. 1 integrated with a basin.

Referring to FIGS. 1, 2 and 4, a valve set for a faucet controlled by a handle easily attachable to wooden and acrylic materials of the present invention is used in pair respectively for hot and cold water. Or, it can also be used alone to provide either hot or cold water.

The valve set controlled by a handle 1 mainly comprises a control valve body 10, a lower block ring 20, a mounting ring 30, an upper block ring 40, a decorative cover 50 and a handle mount 60. The control valve body 10 includes an upper section 11 with an outer screw thread and a lower section 12 with an outer screw thread. The control valve body 10 further includes a top control valve 13 with a top screw hole 131. The lower section 12 with the outer screw thread of the valve body 10 is for connecting a water pipe (not shown). The valve body 10 further includes a transverse pipe with an outer screw thread 15 on a lateral side thereon, thereby cold and hot water can be mixed within said valve body and then guided through a water outlet b.

The lower block ring 20 has a hexagonal edge 21 and an inner screw thread 22 capable of being engaged with the upper section 11 with the outer screw thread of the control valve body 10.

The mounting ring 30 connected with the control valve body 10 has a set of nails 31 on an outer surface thereof, whereby the nail set 31 will be embedded into a attached material 80, a wooden or a acrylic material. Thereby, the control valve body 10 will be mounted on the attached material 80. Further, to enhance the attachment between the lower mounting ring 30, a soft washer 32 is provided between the mounting ring 30 and the attached material 80. The washer 32 further includes a set of holes 321 corresponding to the nail set 31 around the mounting ring 30.

The upper block ring 40 has a hexagonal edge 41 and an inner screw thread 42 capable of being engaged the upper section 11 with the outer screw thread of the control valve body 10 so that the upper block ring 40 can be attached onto an upper surface of the attached material 80.

The decorative cover 50 is an expanded conic shielding body 51 provided above the upper section 11 with the outer screw thread of the valve body 10, thereby shielding the upper block ring 20.

A handle mount 60 connected with the top control valve 13 of the valve body 10 through a washer 61 and a screw 70, whereby the handle mount 60 will be twisted to control a water flow through the top valve 13.

Figure 3:
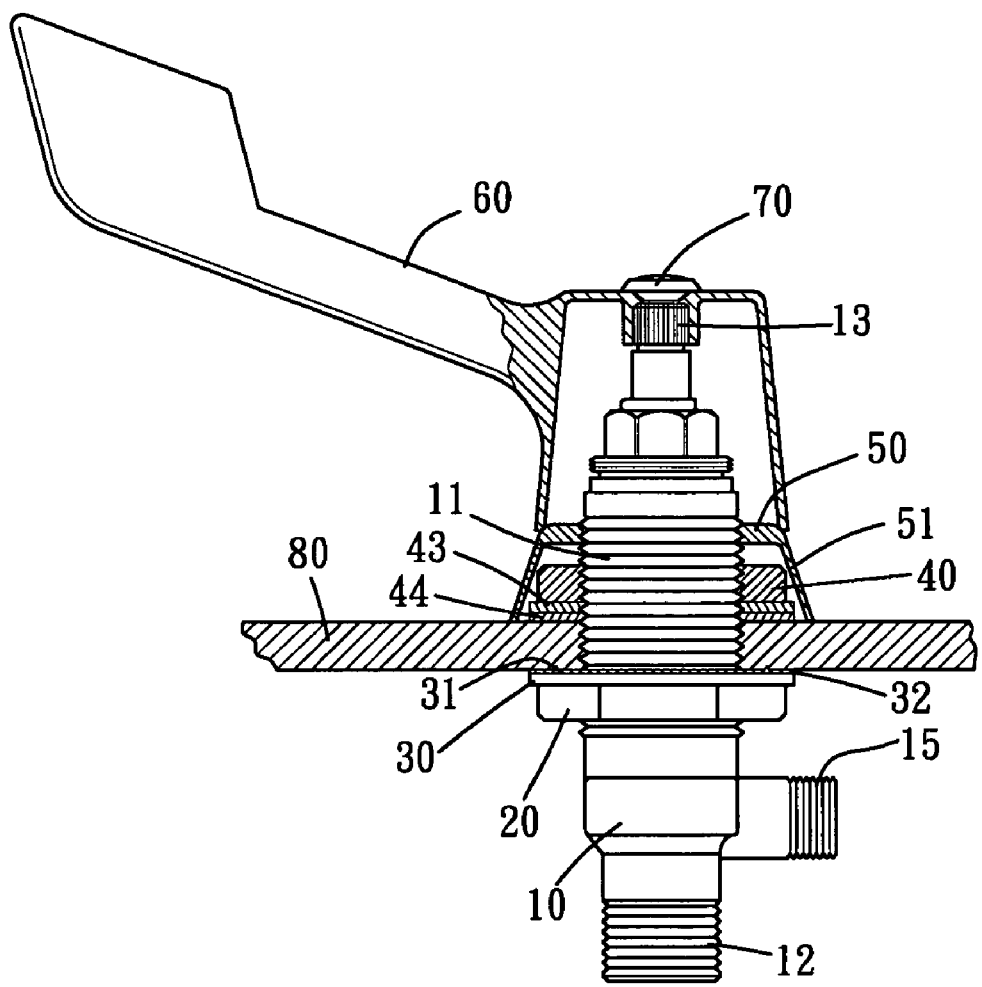
FIG. 3 is a side cross-sectional view of the valve set for a faucet controlled by a handle in FIG. 1 mounted on a wooden or an acrylic material.

Refer to FIGS. 2 and 3 for assembling the present invention.

The lower block ring 20 is firstly screwed on the upper section 11 with the outer screw thread of the valve body 10. The lower block ring 30, the nail set 31 are put on the upper section 11 with the outer screw thread. The valve body 10 is then inserted into a hole on the attached material 80, either a wooden or an acrylic material, and then the lower block ring 20 is twisted so that the nail set 31 of the lower block ring 30 will go through the hole set 321 on the washer 32 and clips on the bottom surface of the attached material 80. The next step is inserting the washer 44, the upper mounting ring 43 and the upper block ring 40, whereby upper block ring 40 is twisted so that it can clip on the upper surface of the attached material 80.

The mounting ring 30 having a set of nails 31 can omit the necessity of holding the lower block ring 20 when twisting the upper block ring 40 by a tool, largely saving work of installing a water faucet.

Figure 5:
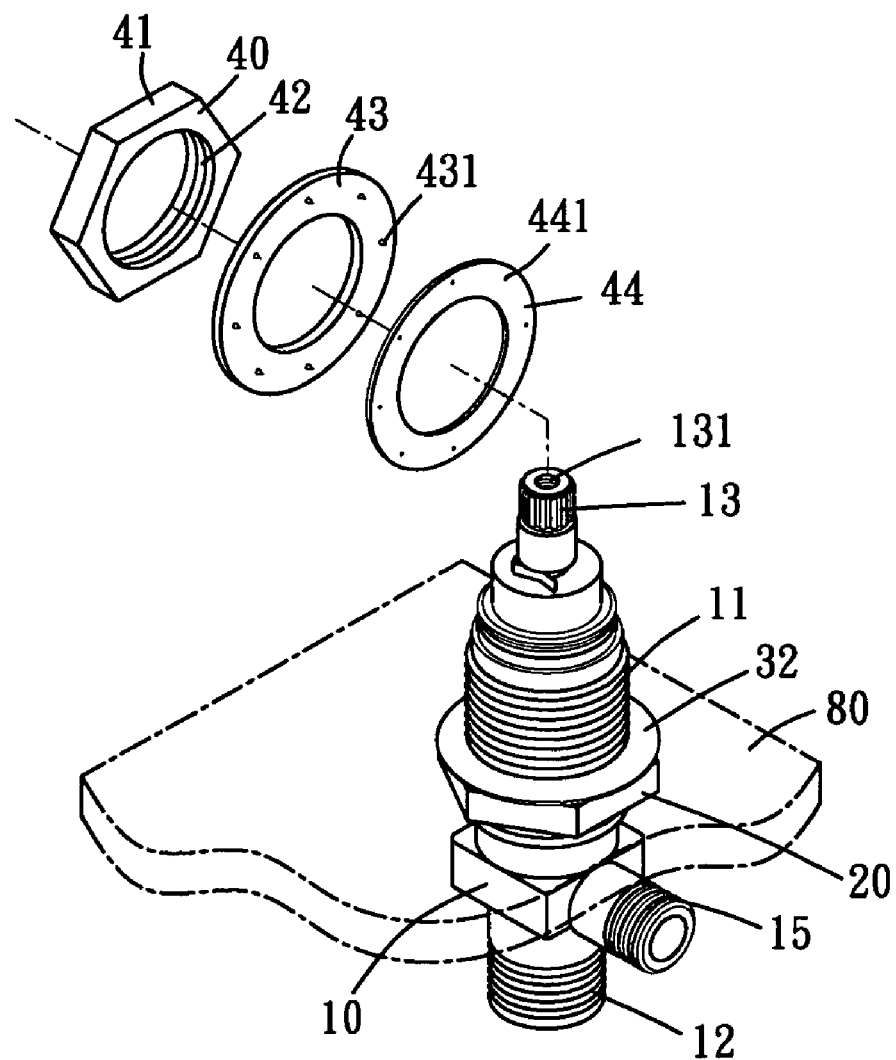
FIG. 5 is an exploded perspective view of the second preferred embodiment of the present invention.
Figure 6:
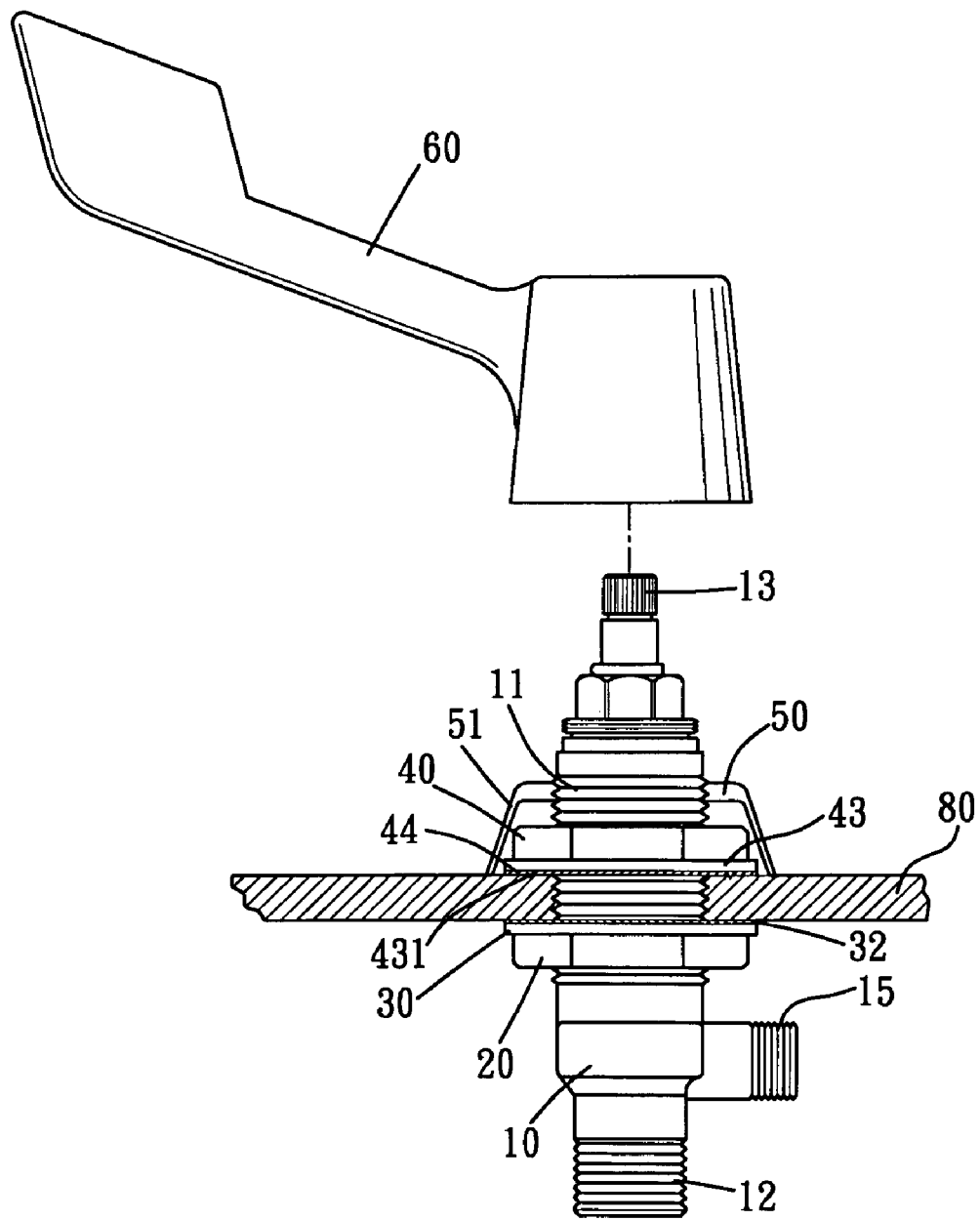
FIG. 6 is a side cross-sectional view of the valve set for a faucet controlled by a handle in FIG. 5.

Referring to FIGS. 5 and 6, the second preferred embodiment of the present invention is similar to the first preferred embodiment, and the differences are illustrated as follows.

In the second preferred embodiment of the present invention, the nail set 31 around the lower mounting ring 30 is omitted, and another set of nails 431 is formed around the upper mounting ring 43. There are holes 441 on the washer 44 corresponding to the set of nails 431. Thereby, a user firstly inserted the valve body 10 into a hole on the attached material 80, and then attaches the lower block ring 20 to the material. The washer 44 and the upper mounting ring 43 are then inserted through the upper section with an outer screw thread that is provided between the lower block ring and said attached material. Thereby, the valve body 10 will cease to rotate when the upper block ring 431 is twisted.

Figure 7:
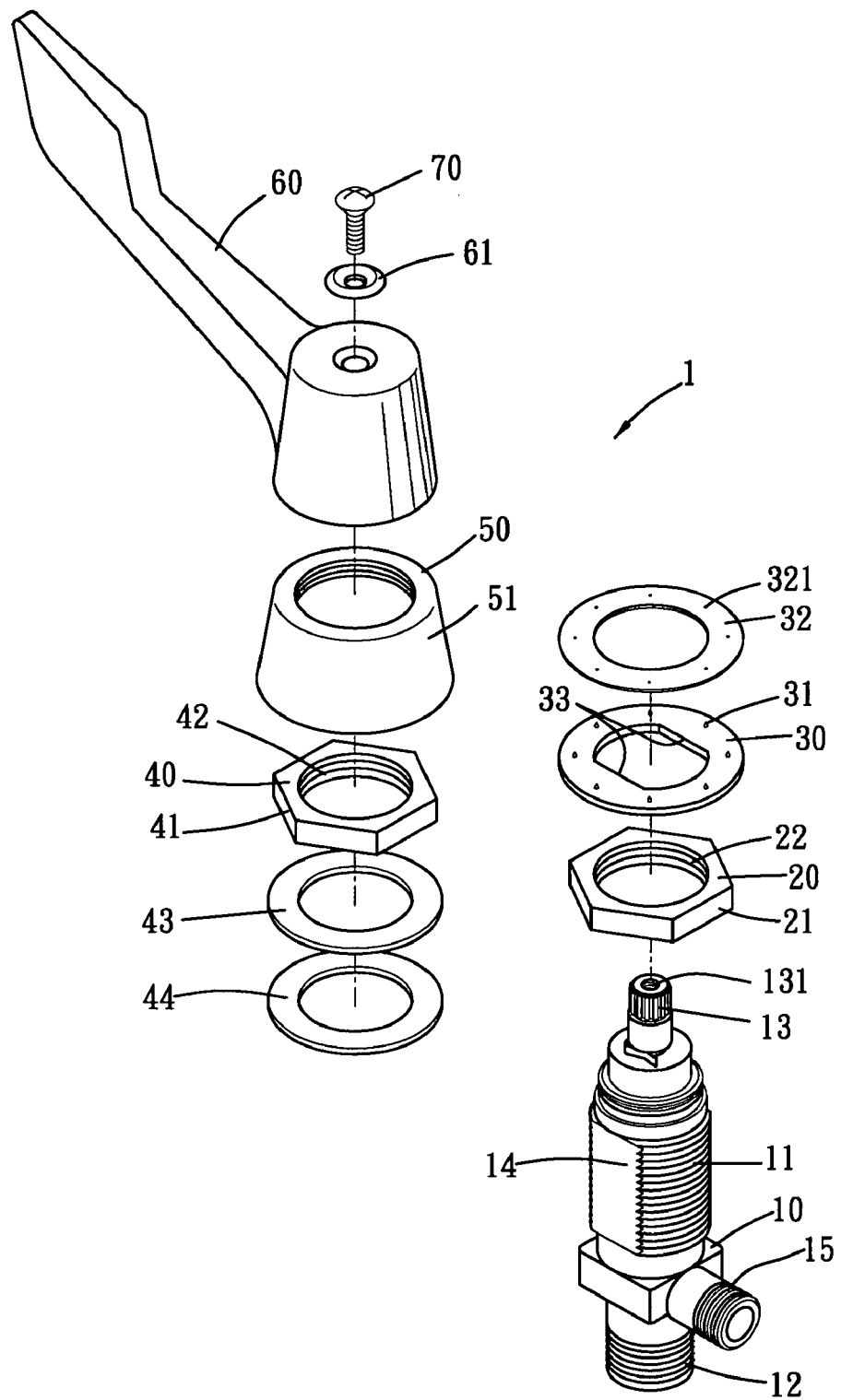
FIG. 7 is an exploded perspective view of the third preferred embodiment of the present invention.

Referring to FIG. 7, the third preferred embodiment of the present invention has a position limiting portion 14 extended along a lateral wall on the upper section 11 with an outer screw thread of the control valve body 10, which is either a flat face or a straight groove. A limiting piece 33 within the inner rim of the mounting ring 30 corresponding to the position limiting portion 14 can be either a straight inner edge or a bulged piece. Further, there is a set of nails around the upper mounting ring 43 for clipping the attached material 80 from above. At the same time, the set of nails 30 around the lower mounting ring 30 clips the attached material 80 from above. Thereby, the valve body 10 can be easily mounted on the attached material 80 by simply twisting the upper block ring 40.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A valve set for a faucet easily attachable to wooden and acrylic materials, comprising:
   (a). a control valve body having an upper section with an outer screw thread disposed around an outer rim of an upper side thereof, at least a limiting portion longitudinally extended along a lateral wall of said upper section, a lower section with an outer screw thread mounted around the outer rim of the lower side thereof, and a control valve provided on the top thereof;
   (b). a lower block ring having a polygonal edge formed around the outer periphery thereof and an inner screw thread fixed around an inner wall thereof for engaging with said upper section of said control valve body;
   (c). an annular upper mounting ring connected with said control valve body and having a plurality of nails arranged on the bottom surface thereof for being embedded into a slab selected from wooden and acrylic materials, and having a limiting piece disposed on two sides of the inner rim thereof for corresponding to said limiting portion of said control valve body, such that said control valve body is mounted on said slab easily and securely;
   (d). an upper block ring having a polygonal edge formed around the outer periphery thereof and an inner screw thread fixed around the inner wall thereof for engaging with said upper section of said control valve body, such that said upper block ring is attached onto an upper surface of said slab; and
   (e). a handle mount connected with said control valve by using a washer and a screw, such that a handle of said handle mount is urged to control a water flow through said control valve.

2. The valve set for a faucet easily attachable to wooden and acrylic materials of claim 1 wherein a washer is provided between said upper block ring and an attached material, and includes a plurality of holes arranged on the bottom surface thereof and communicating therethrough for corresponding to said nails of said mounting ring.

3. The valve set for a faucet easily attachable to wooden and acrylic materials of claim 1 wherein an expanded decorated cover is provided between said handle mount and said upper block ring so as to shield said upper block ring.

4. The valve set for a faucet easily attachable to wooden and acrylic materials of claim 1 wherein said limiting portion of said control valve body is a groove, and said limiting piece of said mounting ring is a bulged piece coupled with said groove.

5. The valve set for a faucet easily attachable to wooden and acrylic materials of claim 1 wherein said limiting portion of said control valve body is a flat face, and said limiting piece of said mounting ring is a straight inner edge.

6. The valve set for a faucet easily attachable to wooden and acrylic materials of claim 1 wherein said lower section of said valve body is used to connect a water pipe, and said valve body further includes a transverse pipe with an outer screw thread on a lateral side thereon, thereby cold and hot water can be mixed within said valve body.

\* \* \* \* \*